United States Patent
Magerl

(10) Patent No.: US 10,160,081 B2
(45) Date of Patent: Dec. 25, 2018

(54) WORKPIECE HOLDER DEVICE AND METHOD FOR MOUNTING A WORKPIECE IN A WORKPIECE HOLDING DEVICE

(71) Applicant: Magerl Feinmechanik GmbH, Laberweinting (DE)

(72) Inventor: Bernhard Magerl, Laberweinting (DE)

(73) Assignee: Magerl Feinmechanik GmbH, Laberweinting (DE)

( * ) Notice: Subject to any disclaimer, the term of this patent is extended or adjusted under 35 U.S.C. 154(b) by 618 days.

(21) Appl. No.: 14/647,696

(22) PCT Filed: Nov. 26, 2013

(86) PCT No.: PCT/EP2013/074787
§ 371 (c)(1),
(2) Date: May 27, 2015

(87) PCT Pub. No.: WO2014/083017
PCT Pub. Date: Jun. 5, 2014

(65) Prior Publication Data
US 2015/0306721 A1    Oct. 29, 2015

(30) Foreign Application Priority Data

Nov. 27, 2012 (DE) .................. 10 2012 111 473

(51) Int. Cl.
| | | |
|---|---|---|
| B25B 1/00 | (2006.01) | |
| B23Q 16/06 | (2006.01) | |
| B23Q 3/06 | (2006.01) | |
| B25B 1/10 | (2006.01) | |
| B25B 1/24 | (2006.01) | |

(52) U.S. Cl.
CPC ........... *B23Q 16/065* (2013.01); *B23Q 3/066* (2013.01); *B25B 1/103* (2013.01); *B25B 1/106* (2013.01); *B25B 1/2415* (2013.01)

(58) Field of Classification Search
CPC .... B25B 1/00; B25B 1/02; B25B 1/10; B25B 5/003; B25B 5/061
See application file for complete search history.

(56) References Cited

U.S. PATENT DOCUMENTS

| | | | | |
|---|---|---|---|---|
| 4,949,444 A | * | 8/1990 | Kojima ................. | B23B 3/06 29/27 R |
| 5,097,575 A | * | 3/1992 | Mitsukuchi ............. | B23B 3/06 29/27 C |
| 5,157,824 A | * | 10/1992 | Kojima ................. | B23B 3/06 29/27 R |
| 5,175,914 A | * | 1/1993 | Mitsukuchi ............. | B23B 3/06 29/27 C |

(Continued)

FOREIGN PATENT DOCUMENTS

| | | |
|---|---|---|
| DE | 3214284 A1 | 10/1983 |
| DE | 4237422 A1 | 6/1993 |

(Continued)

OTHER PUBLICATIONS

International Search Report dated Jul. 4, 2015 for PCT/EP2013/074787 with English translation.

(Continued)

*Primary Examiner* — Lee D Wilson
(74) *Attorney, Agent, or Firm* — Jones Day

(57) ABSTRACT

A workpiece holder device for workpieces to be machined on multiple sides, wherein the workpiece can be held axially and radially relative to the first axis between a first workpiece holder, operatively connected to at least one support spindle of the workpiece holder device and rotatable about a first axis, and at least one second workpiece holder, operatively connected to at least one drive spindle of the workpiece holder device and rotatable around the first axis, by force locking by a clamping force which can be built up in the manner of a vice between the first workpiece holder and the second workpiece holder in the axial direction of the first axis and acting on the opposite sides of the workpiece.

27 Claims, 8 Drawing Sheets

(56) References Cited

U.S. PATENT DOCUMENTS

| | | | | |
|---|---|---|---|---|
| 5,183,272 A | * | 2/1993 | Tyvela | B23B 31/00 |
| | | | | 279/156 |
| 5,214,829 A | * | 6/1993 | Minagawa | B23B 3/162 |
| | | | | 29/27 C |
| 2002/0109282 A1 | | 8/2002 | Peck | |
| 2004/0050222 A1 | * | 3/2004 | Sakashita | B23Q 1/28 |
| | | | | 82/148 |
| 2006/0236514 A1 | * | 10/2006 | Sasazawa | B23B 3/065 |
| | | | | 29/27 C |
| 2012/0186393 A1 | | 7/2012 | Hofmann | |
| 2013/0302104 A1 | | 11/2013 | Hagspiel | |
| 2015/0306721 A1 | * | 10/2015 | Magerl | B23Q 16/065 |
| | | | | 29/559 |

FOREIGN PATENT DOCUMENTS

| | | |
|---|---|---|
| DE | 19701394 C1 | 7/1998 |
| DE | 29900026 U1 | 5/1999 |
| DE | 10258956 A1 | 7/2004 |
| DE | 102004036371 A1 | 2/2006 |
| DE | 202009013241 U1 | 1/2010 |
| DE | 102009026389 A1 | 3/2011 |
| DE | 202010008979 U1 | 4/2012 |
| DE | 102012111473 A1 | 5/2014 |
| EP | 0547554 A1 | 6/1993 |
| EP | 1593455 A1 | 11/2005 |
| EP | 2070655 A2 | 6/2009 |
| WO | WO 2004/054757 | 7/2004 |
| WO | WO 2007/126283 | 11/2007 |
| WO | WO 2014/083017 | 6/2014 |

OTHER PUBLICATIONS

Official Action dated Sep. 19, 2013 in DE 102012111473.0 (priority application).

* cited by examiner

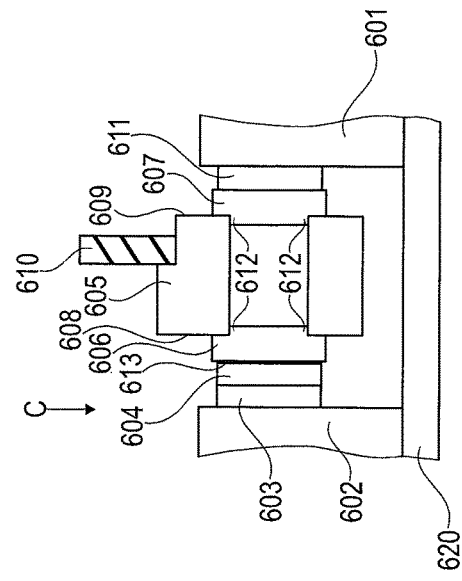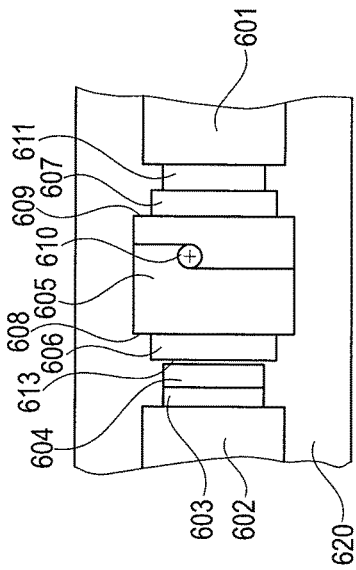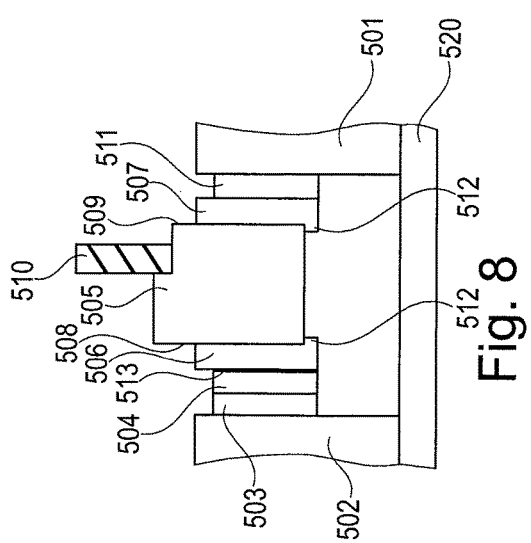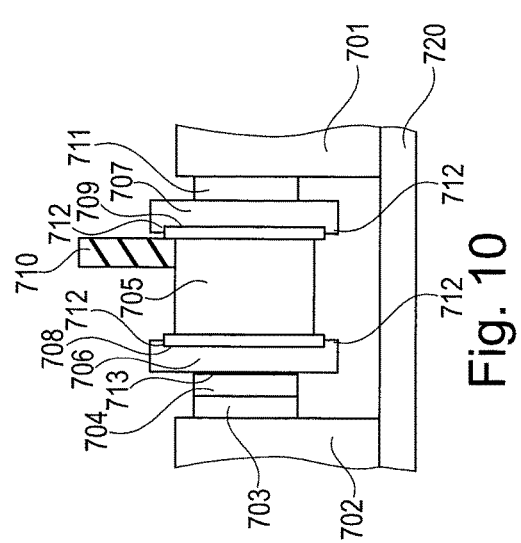

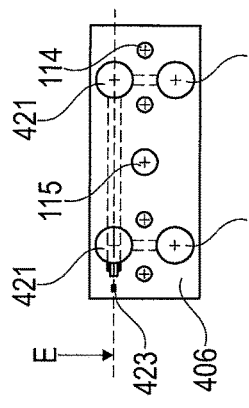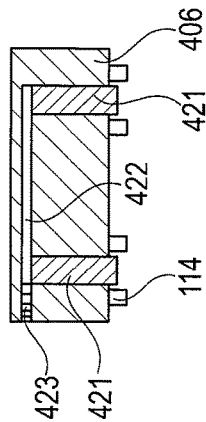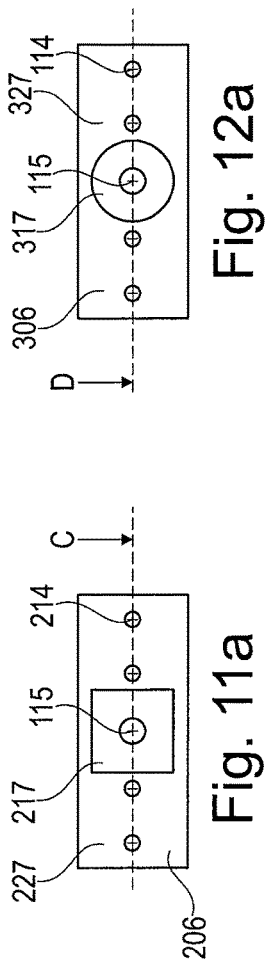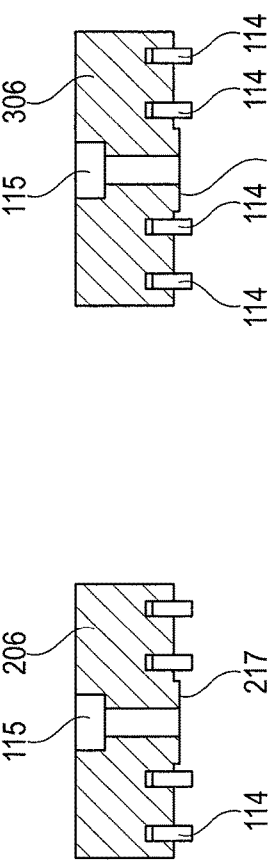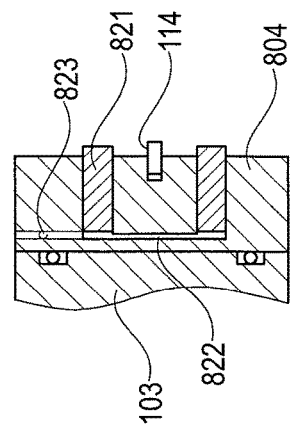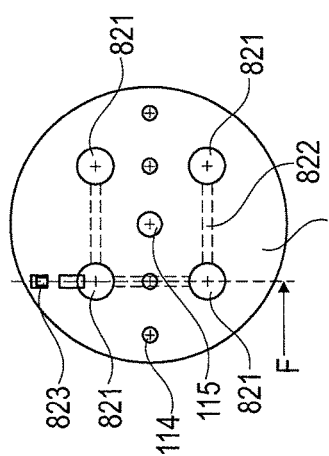

US 10,160,081 B2

1

WORKPIECE HOLDER DEVICE AND METHOD FOR MOUNTING A WORKPIECE IN A WORKPIECE HOLDING DEVICE

CROSS REFERENCE TO RELATED APPLICATIONS

This application is the National Phase application of International Application No. PCT/EP2013/074787, filed Nov. 26, 2013, which designates the United States, and which further claims the benefit of priority from German Patent Application No. 1022012111473.0, filed Nov. 27, 2012. The foregoing related applications, in their entirety, are incorporated herein by reference.

The present invention relates to a workpiece holder device for workpieces to be machined on multiple sides, wherein the workpiece can be held axially and radially relative to the first axis between a first workpiece holder, operatively connected to at least one support spindle of the workpiece holder device and rotatable about a first axis, and at least one second workpiece holder, operatively connected to at least one drive spindle of the workpiece holder device and rotatable around the first axis, by force locking by means of a clamping force which can be built up in the manner of a vice between the first workpiece holder and the second workpiece holder in the axial direction of the first axis and acting on the opposite sides of the workpiece. The first workpiece holder has at least one first clamping element with a first smooth clamping face facing towards the second workpiece holder and/or the workpiece and the second workpiece holder has at least a second clamping element with a second smooth clamping face facing towards the first workpiece holder and/or the workpiece.

Workpiece holder devices are generally known from the prior art. Such a machine vice is disclosed, for example, in DE 32 14 284 C2. For clamping and holding workpieces during machining are provided a stationary clamping jaw and a carriage holding a second clamping jaw slidably guided on a base plate. The second clamping jaw can be displaced in a tensioned disposition against a workpiece between the clamping jaws, and can be placed back into a workpiece release position.

A category-typical workpiece holder device is further known from DE 42 37 422 C2. It is proposed that two workpiece holders of the workpiece holder device are designed as clamping elements able to engage in the manner of a vice against two opposing surfaces of a workpiece, which in substance only establish force-locking clamping forces. The shape of the clamping elements is hereby adapted to the cross section of a workpiece to be held in the area of the clamping surface, or to multiple workpieces of the same type to be held in the same way in the area of the clamping surfaces.

Moreover, DE 197 01 394 C1 discloses a category-typical holder device for multi-sided workpieces to be machined. To compensate for elastic deformation of the holder device during the clamping of workpieces, it is proposed that a drive spindle and a support spindle are mounted in a rigid state such that their axes have a slope of a particular angle against a machine tool. This angle extends after the clamping of a workpiece with a nominal clamping force in a coaxial orientation across the two axes.

The workpiece holder devices known from the prior art have fundamentally proven themselves.

In FIGS. 1 and 2, the basic structure of a category-typical workpiece holder device as is known from the prior art is shown.

2

The workpiece holder device comprises a first housing 1 as well as a second housing 2. The second housing 2 serves for mounting a support spindle 3, which force-lockingly abuts a work piece 5 via a first clamping element 4. On the side of the workpiece 5 away from the housing 2 and the support spindle 3 is located a force locking clamping element 7. The first clamping element 4 contacts thereby a clamping surface 8 of the workpiece 5, while the clamping element 7 contacts a clamping surface 9 or the workpiece 5. The workpiece 5 can be machined by means of a tool in the form of a milling cutter 10.

In order to enable a multi-sided machining of the workpiece 5, the second clamp 7 is connected to a drive spindle 11 which is mounted in the housing 1. The housing 1 and the housing 2 are mounted on a machine frame 20.

In the constellation shown in FIG. 1, the workpiece has ideal plane-parallel clamping surfaces 8, 9. This causes a clamping force K1, established by means of a support spindle 3, to be transferred via the clamping element 4 across the largest possible area of the clamping face 8 uniformly to the workpiece 5; in particular the clamping force K1 in the region of the clamping element 4 and the clamping face 8 extends parallel to a first axis R, about which the workpiece is rotatable by means of a drive spindle 11.

In FIG. 2 is shown the workpiece holder device of FIG. 1 in a configuration such that the workpiece 5' is clamped, but which does not have the clamping surfaces 8', 9' plane-parallel to one another. In particular, the clamping surface 8' is inclined at an angle a with respect to the clamping surface 9'.

Due to the fact that the clamping element 4 does not lie completely against the clamping surface 8' of the workpiece 5', the clamping force K1 leads to the formation of two force components K1a and K1b within the workpiece 5'. Thereby is the force component K1a in particular not formed parallel to the first axis R, so there arises a force component in a radial direction with respect to the first axis R. In particular with a rotation of the workpiece 5 about the first axis R can occur a movement of the workpiece 5 relative to the clamping element 4 in the region of the clamping surface 8'. This may for example be a tilting of the workpiece or a movement in the radial direction of the axis R. Through the selective power influence in the workpiece 5' can also be adversely created a structure of the workpiece 5', in particular the deformation of the workpiece 5'.

Both the possible relative movement of the workpiece 5' with respect to the clamping element 4 and the deformation of the clamping piece 5' lead to an impossibility of the precise machining of the workpiece 5'.

The object of the present invention is therefore to further develop the category-typical workpiece holding device such that the disadvantages of the prior art are overcome; in particular will be provided a workpiece holder device in which a precise machining of a workpiece with a wide range of tolerance with respect to the shape of the workpiece, in particular a movement of the workpiece in a radial direction to a first axis of a drive spindle and/or in which a deformation of the workpiece will be avoided; and furthermore to make possible an effectively fully automatic, or at least semi-automatic placement of the workpiece holder device, but without the need to accept losses of the positioning accuracy of the workpiece holder device.

This object is achieved according to the invention in that the first clamping element and/or the second clamping element is or are constructed in multiple parts, whereby a first clamping element part of the respective clamping element is movable relative to the second clamping element part of the clamping element in such a way that a first angle between the first axis and the normal direction of the first clamping face and/or a second angle between the first axis and the normal direction of the second clamping face is variable.

It is thereby particularly preferred that the first clamping element and/or the second clamping element is or are constructed in two pieces, the support spindle is mounted in at least one first housing and/or the support spindle and/or the first housing is mounted displaceably in the coaxial direction of the first axis and/or of the drive spindle, preferably by means of at least one drive means, preferably reciprocably, and/or the drive spindle is mounted in at least one second housing and/or the drive spindle comprises at least one angle-switchable angle switching means, in particular about the first axis.

It is also proposed in the aforementioned embodiment that the first housing and the second housing are mounted on at least one support structure, such as a machine frame.

A workpiece holder device according to the invention may also be characterized in that the angle switching means and/or the drive means comprises at least one motor driven, electric motor driven, hydraulic and/or pneumatic actuator.

The invention proposes that the clamping force created by the first workpiece holder and the second workpiece holder substantially acts exclusively by force-locking.

It is further preferred that the first clamping face and/or the second clamping face is or are disposed on the surface of the second clamping element part away from the first clamping element part and/or in the region of the first clamping face and/or in the region of the second clamping face is provided a fictional resistance-increasing structure, such as a corrugation and/or a covering.

It is particularly preferred that the first clamping element part and the second clamping element part are joined with one another via at least one spherical bearing, preferably captive and/or secure from rotary entrainment.

Furthermore, a workpiece holder device according to the invention may be characterized in that the first clamping element part is in contact in the region of at least one first contact surface with at least one second contact surface of the second clamping element part, wherein the first axis runs through a center of gravity of the first contact surface, in particular a projection of the first contact surface in a plane perpendicular to the first axis, and/or a center of gravity of the second contact surface, in particular a projection of the second contact surface in a plane perpendicular to the first axis.

In the aforementioned embodiment it is particularly preferred that the first contact surface is smaller than a first surface of the first clamping element part facing the second clamping element part and/or that the second contact surface is smaller than a second surface of the second clamping element part facing the first clamping element part, wherein the surface area of the first surface is preferably more than 125% of the surface area of the first contact surface and/or the surface area of the second surface is preferably more than 125% of the surface area of the second contact surface, and/or the first contact surface at least partially protrudes from the first surface and/or the second contact surface at least partially protrudes from the second surface.

The two above-mentioned embodiments may also be characterized in that the first contact surface and/or the second contact surface extend at least partially perpendicular to the first axis, at least partially having a curved contour and/or extending in an incline in a plane spanned by the first axis and perpendicular to the first axis.

It is furthermore proposed for the aforementioned embodiments that the first contact surface and/or the second contact surface have a square, circular, elliptical and/or rectangular peripheral shape in a plane perpendicular to the first axis.

It is particularly preferred in the aforementioned embodiments that the spherical bearing comprises at least one fixing element at least partially penetrating the first clamping element part and the second element part, such as at least one fastening bolt, at least one fastening screw and/or at least one securing bolt.

In the aforementioned embodiment it is proposed that a plurality of fixing elements is provided, the fixing element at least partially penetrates into the drive spindle or the support spindle, is connected with the drive spindle or the support spindle in particular by means of at least one connecting means, and/or the second clamping element part is movable relative to the fixing element, in particular mounted with play with respect to the fixing element.

It is hereby particularly preferred that the connecting means comprises at least one screw connection, at least one snap-in connection, at least one clip connection and/or at least one adhesive connection.

A workpiece holder device according to the invention can also be characterized by at least one resetting means at least partially disposed between the first clamping element part and the second clamping element part.

In the aforementioned embodiment is especially preferable that the resetting means comprises at least one preferably mechanical, hydraulic and/or pneumatic spring means.

It is further proposed with the invention that the spring means comprises at least one bearing pin at least partially mounted in the first clamping element part and, abutting the second clamping element part, preferably the second contact surface and/or the second surface, and/or at least one bearing pin at least partially mounted in the second clamping element part and abutting the first clamping element part, preferably the first contact surface and/or the first surface, whereby a resetting force can preferably be exerted onto the second clamping element part via the bearing pin by means of at least one resetting element on a bearing pin mounted in the first clamping element part on the side opposite the second clamping element part, and/or onto the first clamping element part via the bearing pin by means of at least one resetting element on a bearing pin mounted in the second clamping element part on the side opposite the first clamping element part.

It is hereby particularly preferred that the resetting element comprises at least one mechanical spring element, at least one compressible or incompressible fluid comprising fluid spring element, preferably a hydraulic or pneumatic spring element.

Furthermore, the invention proposes that the fluid spring element, which is constituted by free space filled by fluid, is disposed at least partially through at least one bearing pin mounted in the first clamping element part on the side opposite the second clamping element part, or at least partially through at least one bearing pin mounted in the first clamping element part on the side opposite the first clamping element part, whereby a plurality of bearing pins and fluid spring elements are preferably provided and at least two free spaces, preferably all free spaces, are connected with each other by means of at least one fluid channel, in particular at least partially formed in the first clamping element part and/or the second clamping element part.

It is further proposed for the invention that the pressure of the fluid in the free spaces and/or in the channel is adjustable by means of at least one fluid port.

A workpiece holder device according to the invention can also be characterized in that the first clamping element, the second clamping element, the first clamping element part and/or the second clamping element part comprises on a side facing the workpiece at least one elevation, such as a step, whereby the workpiece is preferably at least partially form-fittingly holdable by means of the elevation, the workpiece in particular at least partially abuts the elevation.

Alternately or in addition to the multi-part design of the first and/or second clamping elements by means of clamping element parts can be provided that the first clamping element, the second clamping element, the first clamping element part and/or the second clamping element part is or are constructed in multiple parts, preferably in two parts, whereby at least a first clamping element member of the respective clamping element and/or clamping element parts are movable relative to at least one second clamping element member in a direction of displacement, particularly in a radial direction of the first axis.

In the aforementioned embodiment is especially preferable that at least one guiding means is provided, by means of which the first clamping element member and the second clamping element member are led along a direction of displacement relative to one another, preferably comprising at least one transmission thread, at least one gearing, at least one tongue and groove connection and/or at least one dovetail guide.

It is also proposed in the two above-mentioned cases that the movement along the direction of displacement is adjustable, controllable and/or regulated by means of at least one displacement means; the displacement means preferably comprises at least one knurled screw, at least one transmission thread and/or at least one electric, pneumatic, hydraulic and/or mechanical displacement actuator.

A workpiece holder device according to the invention can, through further additional or alternative multi-part design of the first and/or second clamping element via clamping element parts, be so characterized, that the workpiece comprises at least one multiple clamping element, wherein at least one single workpiece, preferably a plurality of single workpieces, can be connected with the multiple clamping element by means of at least one fixing means.

In the aforementioned embodiment, it is especially preferred that the single workpiece is connectible with the multiple clamping element form-fittingly and/or through force locking by means of a fixing element and/or a that plurality of fixing elements along the first axis and/or along the surface of the multiple clamping element is provided around a circumference of the first axis.

It is also preferred that the multiple clamping element abuts the first workpiece holder, the second workpiece holder, the first clamping element, the second clamping element, the first clamping element part, the second clamping element part, the first clamping element member and/or the second clamping element member.

In a further alternative embodiment of the workpiece holding device, the workpiece holding device, in addition to multi-part configuration of the first and/or second clamping member by the clamping piece parts or alternatively, be characterized by at least one locking means, by means of which the first workpiece holder, the first clamping piece, the second clamping portion, the first clamping piece part, the second clamping piece part, the first clamping piece element and/or the second clamp element in at least a first predetermined rotational position about the first axis is locked.

It is thereby particularly preferred that the locking means comprises at least one locking element, wherein the locking element by means of at least one hydraulic, pneumatic, magnetic, electromagnetic and/or mechanical locking actuator, preferably against the force of the at least one spring element, can be brought into engagement with the first workpiece holder, the second workpiece holder, the first clamping element, the second clamping element, the first clamping element part, the second clamping element part, the first clamping element member and/or the second clamping element member.

It is also proposed in the aforementioned embodiments that by means of a locking means, preferably through a movement of the locking element from a release position into a locking position, the first workpiece holder, the second workpiece holder, the first clamping element, the second clamping element, the first clamping element part, the second clamping element part, the first clamping element member and/or the second clamping element member are movable from a rotational position different from the predetermined rotational positions into a predetermined rotational position.

A workpiece holder device according to the invention can further be characterized by at least one fixing apparatus, by means of which the first workpiece holder, the second workpiece holder, the first clamping element, the second clamping element, the first clamping element part, the second clamping element part, the first clamping element member and/or the second clamping element member can be locked in any desired rotational position about the first axis.

Finally it is proposed for the workpiece holding device according to the invention that the fixing apparatus comprises at least one hydraulic, pneumatic, magnetic, electromagnetic and/or mechanical locking actuator.

Furthermore, the invention provides a method for fitting a workpiece holder device, in particular a workpiece holder device according to the invention with at least one workpiece, particularly to be machined on multiple sides, wherein the workpiece is held between an operatively connected first workpiece holder with at least one support spindle of the workpiece holder device and which is rotatable about a first axis, and at least one operatively connected second workpiece holder with at least one drive spindle of the workpiece holder device and which is rotatable about the first axis, and the workpiece is held axially, radially and by force locking with respect to a first axis by means of a clamping force between the first workpiece holder and the second workpiece holder in the axial direction of the first axis, which can be built up in the manner of a vice and which acts on opposite sides of the workpiece, wherein further the first workpiece holder and/or the second workpiece holder is locked in at least one predetermined rotational position about the first axis at least indirectly by means of a first locking means before and/or during the buildup of the clamping force and/or during and/or after the removal of the clamping force.

It is also proposed for the method that the first workpiece holder, the second workpiece holder, the first clamping element, the second clamping element, the first clamping element part, the second clamping element part, the first clamping element member and/or the second clamping element member is locked.

It can thereby be provided that the first clamping element, the second clamping element, the first clamping element part, the second clamping element part, the first clamping element member and/or the second clamping element member can be moved from a rotational position different from the predetermined rotational position into the predetermined rotational position by means of a locking means.

It is finally proposed for the method according to the invention that the workpiece is positioned automatically, at least semi-automatically, preferably by means of at least one robotic means, between the first workpiece holder and the second workpiece holder.

The invention is thus based on the surprising finding that, by means of the two-part design of a clamping element, in particular a clamping element disposed on the support spindle, wherein a first clamping element part of the clamping element and a second clamping element part are movable relative to one another, a precise mounting of a workpiece can be ensured, even in the case that the workpiece has component tolerances, for instance having no clamping surfaces which are mutually plane-parallel to one another. It is thus possible that an inclination of the clamping face of the workpiece can be compensated through the relative movement of the clamping element parts, and an ideal flow of power of a clamping force can be ensured in the workpiece; in particular can be ensured that the clamping force introduced into the workpiece has no radial component with respect to a first rotational axis of the drive spindle.

In addition, it is possible to further fix the workpiece exclusively by means of force locking, i.e. in particular, no clamping elements which are adjusted to the clamping surfaces must be kept and used in order to avoid a movement of the workpiece in a radial direction via a force-locking fixing.

The full-surface system in which the total clamping faces of the clamping elements, in particular the clamping element parts and/or the clamping element members facing the workpiece, thus especially offers the advantage that a form-fitting connection can largely be dispensed with and a predominantly, if not exclusively, force-locking connection can be established. If, for example, individual elevations were employed which were mounted movably in an axial direction of the first axis on the clamping element to compensate for an inclination of the workpiece surface and which were located respectively on the surface of the workpiece, a secure, exclusively force-locking connection could not be realized. A force component in a radial direction of a first axis would thus arise on the surface of each of the elevations. Thereby would exist a comparable situation as is shown in FIG. 2.

Here, the movement of the workpiece in a radial direction can yet further be prevented in that a frictional resistance-increasing structure, such as a corrugation, can be provided on a clamping face of a clamping element, in particular the second clamping element part.

The clamping element parts are particularly connected by means of a spherical bearing. By means of the spherical bearing is particularly formed a loss prevention, thus preventing a separation of the first clamping element part from the second clamping element part. At the same time, however, the spherical bearing allows a relative movement of the first clamping element part with respect to the second clamping element part, in particular to make possible an inclination of the normal direction of the clamping face of the clamping element relative to the first axis.

At the same time is ensured by the joint bearing that the clamping element parts are connected with each other in a manner secure from rotary entrainment, in particular during a rotation of the first axis, and at the same time is prevented a movement of the first clamping element part in a radial direction of the first axis relative to the second clamping element part, or vice versa.

In order to allow a relative tilting of the first clamping element part to the second clamping element part, it is provided that the first clamping element part contacts the second clamping element part only in the region of a first contact surface of the first clamping element part and a second contact surface of the second contact element part. In this case, the first contact surface is smaller than the surface of the first clamping element part which faces the second clamping element part, and the second contact surface is smaller than the surface of the second clamping element part which faces the first clamping element part. This means that in the area outside the first contact surface and the second contact surface, the first surface of the first clamping element part is at least partially apart from the second surface of the second clamping element part. The thusly existing gap between these two surfaces enables the tilting of the first clamping element part relative to the second clamping element part.

The respective contact surfaces may have different surface shapes. It is thus conceivable that the first contact surface extends substantially planar to a radial direction of the first axis. Alternatively, however, this contact surface can also be curved to facilitate a tilting movement of the clamping element parts relative to each other.

In addition, a circumference of the contact surfaces can be radially symmetrical, to allow a uniform tilt in all directions. However, the circumference of the contact surfaces can also be asymmetrical, for example rectangular, square or elliptical, in order to develop the tilting characteristic differently in varying directions.

The spherical bearing is preferably formed by a plurality of fixing elements. The spherical bearing can thus comprise a fastening screw which substantially passes completely through the first clamping element part and the second clamping element part so as to be fastened by means of a screw connection in the drive spindle or the support spindle. Thereby is present a certain play between the fastening screw, the first clamping element part and the second clamping element part, in order to enable a relative movement of the clamping element parts with respect to one another.

In addition, the spherical bearing preferably has a plurality of securing bolts, which are in particular disposed circumferentially about the first axis in order to ensure a connection between the clamping element parts secure from rotary entrainment. At the same time there is a certain play between the clamping element parts and the securing bolt to enable a relative movement of the clamping element parts for a tilting movement relative to the first axis.

Further may be provided a resetting means between the first clamping element part and the second clamping element part. With this resetting means is ensured that the clamping face of the two-part clamping element is aligned in an unloaded state, ideally plane-parallel to the first axis such that a normal direction of the clamping face extends parallel to the first axis. The resetting means thereby preferably comprises a spring element, by means of which the bearing pins mounted in the first clamping element part are forced against the second clamping face and the second surface of the second clamping element part. A plurality of bearing pins are preferably provided, which are disposed circumferentially relative to the first axis, in order to provide a consistent resetting force about the first axis.

It is hereby preferred that fluid spring elements, in particular hydraulic spring elements, are used as spring elements. For this are preferably formed channels in the first and second clamping element parts which connect free spaces provided behind the bearing pins with one another. This configuration causes, in particular, that the resetting force is applied uniformly distributed over the circumference in order to ensure a perfect parallel alignment of the normal direction of the clamping faces to the first axis.

In order to further achieve the best possible positioning and orientation of the workpiece, in particular of at least partially form-fittingly held workpieces, can be provided additionally or alternatively to a multi-part design of the clamping elements by clamping element parts a design of multiple clamping element members. The clamping element members are preferably movable relative to one another in a direction of displacement, in particular a direction perpendicular to the first axis. In this way, continuously adjustable clamping or gripping jaws can be provided. This allows that the clamping element members which engage the workpiece, and thus the workpiece itself, can be positioned in the direction of displacement, in particular in a radial direction with respect to the first axis. It can be provided that a scale is provided to indicate a relative position of the clamping element members to one another. The displacement of the clamping element members relative to one another can occur particularly via a displacement means, such as a transmission thread or a knurled screw, wherein the movement is preferably guided by means of a guiding means. The guide means may comprise in particular a gearing or a dovetail joint between the clamping element members.

Particularly in the case of an automatic or semi-automatic fitting of the workpiece holder device with workpieces, it is alternatively or additionally to the multi-part design of the clamping elements by means of clamping element parts advantageous, when a multiple clamping element is used. This makes possible that when using several multiple clamping elements, when a first multiple clamping element is clamped in the workpiece holder device, a plurality of single workpieces can be loaded outside of the workpiece holder device. The exchange of multiple clamping elements in the workpiece holder device can be carried out automatically or semi-automatically by means of a robot, so that set-up times are minimized. Corresponding multiple clamping elements can be clamped either directly between the workpiece holders or between clamping elements, in particular with a multi-part design. It is hereby especially preferred that the multiple clamping element is clamped at least partially form-lockingly in the workpiece holder or the clamping elements or the clamping element parts or the clamping element members. For fitting the workpiece holder device, the multiple clamping element or the clamping bridge is positioned between the support spindle and the drive spindle.

For an automatic or semi-automatic fitting of the workpiece holder device, it is further preferred that for every loading cycle, the drive spindle and/or the support spindle is disposed in a predetermined (rotational) position. In particular in the case that the workpiece, in particular the multiple clamping element, is at least partially form-fitting with the drive or support spindle, this predetermined position, in particular a rotational position, about the first axis is important for a complication-free feed.

To achieve this alignment, the workpiece holder device can comprise alternatively or additionally to the multi-part design of the clamping elements by means of clamping element parts a locking means. By means of this locking means, at least one element co-rotating with the workpiece region of the drive spindle or the support spindle is forced into a predetermined rotational position about the first axis. In particular during a movement of the locking element from a release position into a locking position, the co-rotating element is forced into the predetermined rotational position and held there. The holding of the element by means of a locking means can be further supported by a fixing apparatus, wherein the element is preferably adjustable in every rotational position by means of the fixing apparatus, while the element is fixed in at least one predetermined rotational position by means of the locking means.

Through use of the locking means, in particular in combination with the fixing apparatus, it can be ensured that the first workpiece holder, the second workpiece holder, the first clamping element, the second clamping element, the first clamping element part, the second clamping element part, the first clamping element member and/or the second clamping element member are located in a predetermined rotational position when the workpiece is removed from the workpiece holder device and a new workpiece is clamped in the workpiece holder device.

Further features and advantages of the invention will become apparent from the following description, in which preferred embodiments of the invention are explained with reference to schematic drawings.

FIG. 6b shows a view of the workpiece holding region according to FIGS. 4b and 5b during use of the first clamping element shown in FIG. 6a;

FIG. 7b shows a view according to FIGS. 4b, 5b, 6b of a workpiece holding region during use of the first clamping element shown in FIG. 7a;

FIG. 8 shows a perspective view of a workpiece holding region of a workpiece holder device according to the invention with eccentric clamping of a workpiece;

FIG. 9a shows a perspective view of a workpiece holder device with clamping of two workpieces;

FIG. 9b shows a view of the workpiece holder device of FIG. 9a from direction C;

FIG. 10 shows a view of a workpiece holder device with centric clamping of a workpiece;

FIG. 11a shows a view along the axis R of a first embodiment of a second clamping element;

FIG. 11b shows a cross-sectional view of the second clamping element of FIG. 11a from direction C;

FIG. 12a shows a view according to FIG. 11a of an alternative embodiment of a second clamping element;

FIG. 12b shows a cross-sectional view of the second clamping element of FIG. 12a from direction D;

FIG. 13a shows a view according to FIGS. 11a and 12a of a second clamping element with a resetting means;

FIG. 13b shows a cross-sectional view of the second clamping element of FIG. 13a from direction E;

FIG. 14a shows a view of an alternative embodiment of a first clamping element part with a resetting means along axis R; and FIG. 14b shows a cross-sectional view of the first clamping element part of FIG. 14a from direction F;

Figure 1:
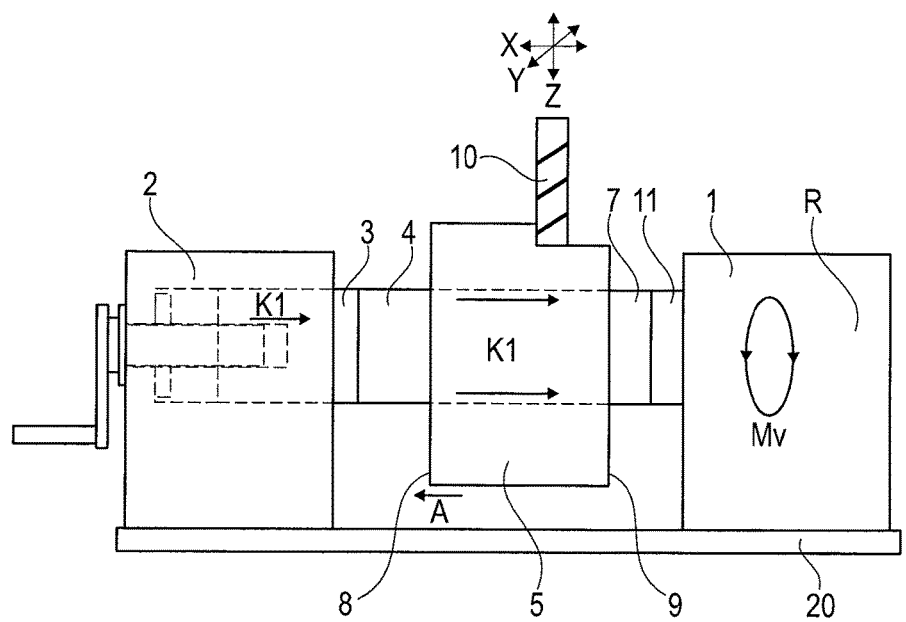
FIG. 1 shows a schematic view of a workpiece holder device according to the prior art.
Figure 2:
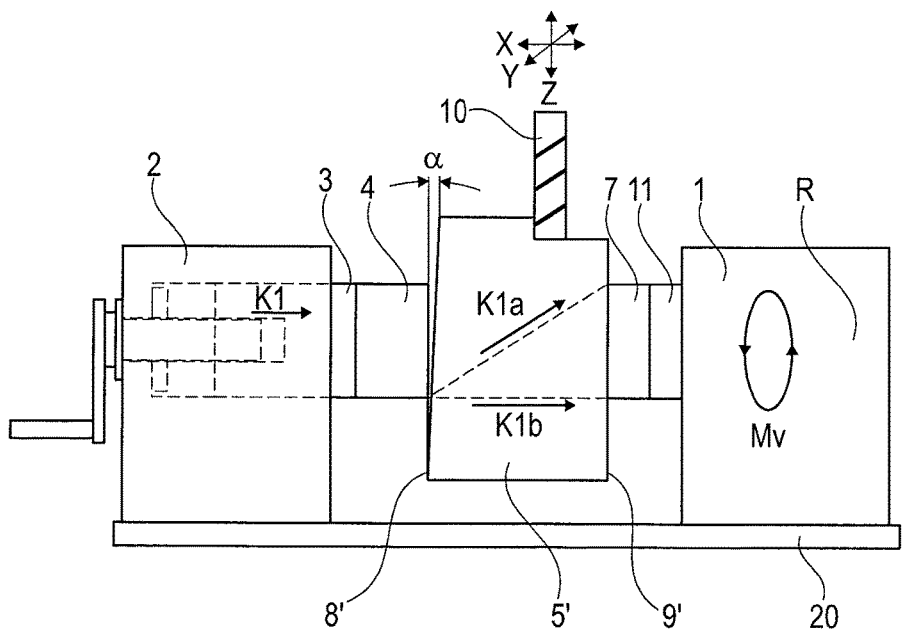
FIG. 2 shows a schematic view of the workpiece holder device of FIG. 1 with another clamped workpiece.
Figure 3:
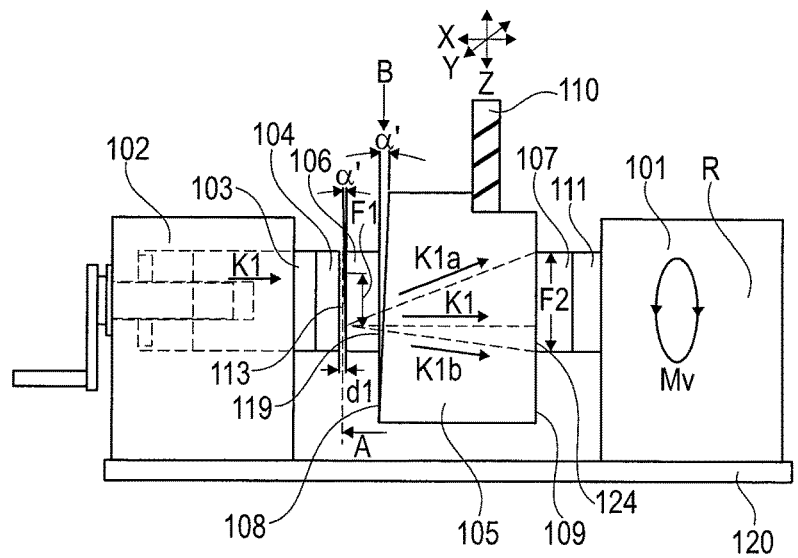
FIG. 3 shows a schematic view of a workpiece holder device according to the invention.

The workpiece holder device shown in FIG. 3 has a housing 101, a housing 102, in which the supporting spindle 103 is mounted. A first clamping element part 104 for holding a workpiece 105 is connected with the support spindle 103. The clamping element connected with the support spindle 103 is constructed in two pieces and comprises apart from the first clamping element part 104 a second clamping element part 106.

On the side of the workpiece 105 facing away from the support spindle 103, the workpiece 105 is in contact with a second clamping element 107. Here, the first clamping element 106 sits with a clamping face 119 against a clamping surface 108 of the workpiece 105, while the second clamping element 107 sits against a clamping surface 109 of the workpiece 105 via a clamping face 124.

The workpiece 105 can be machined by means of a cutter 110, wherein the workpiece 105 is rotatable around a first axis R via a drive spindle 111 connected to the clamping element 107.

The housings 101, 102 are mounted on a machine frame 120.

Similarly to workpiece 5', workpiece 105 does not have ideally plane-parallel clamping surfaces 108, 109. In particular, the clamping surface 108 is inclined in a radial direction of the first axis R by an angle α'.

However, this angle is balanced by a relative tilt of the second clamping element part 106 at an equal angle α' to the first clamping element part 104. This tilting is possible in particular in that the first clamping element 104 and the second clamp 106 have a partial gap d1 between them.

Figure 4A:
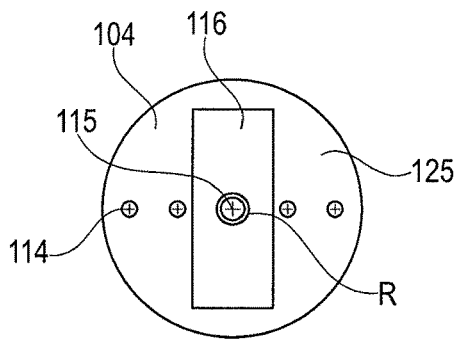
FIG. 4a shows a view of a first clamping element of the workpiece holder device of FIG. 3 from direction A.
Figure 4B:
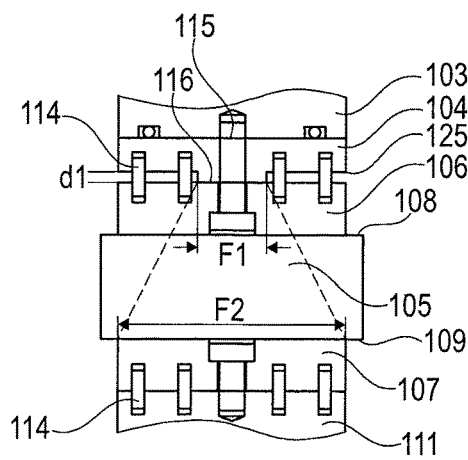
FIG. 4b shows a tip view of the workpiece holding region of the workpiece holder device of FIG. 3 from direction B in FIG. 3.

The formation of the gap d1 is particularly visible in FIGS. 4a and 4b. In FIG. 4a is shown a view of the first clamping element 104 from direction A in FIG. 3. The first clamping element 104 has a first surface 125.

The first contact surface 116 protrudes from the surface 125. Here, the contact surface 116 is disposed on the first clamping element part 104 such that the first axis R passes through a center of gravity of the contact surface 116. The center of gravity of a surface is understood to be the intersection of the perpendicular straight lines emanating from the respective vertices of the surfaces. These perpendicular straight lines represent so-called gravity lines, and the intersection of two or all gravity lines represents the center of gravity of the surface.

As can be seen particularly in FIG. 4b, the first clamping element part 104 contacts the second clamping element 106 in the region of the first contact surface 116. However, the surface 125 outside the first contact surface 116 is spaced apart from the second clamping element part 106 by the gap d1.

Through the tilting of the first clamping element part 104 relative to the second clamping element part 106, enabled by the gap d1, results in that the clamping force K1, as is shown in FIG. 3, divides itself into the clamping force components K1a and K1b such that the radial components of the clamping force components K1a and K1b cancel out, so that only one clamping force K1, running in an axial direction of the axis R, acts on the workpiece 105.

In order to achieve the best possible tilting of the clamping element pieces 104 and 106, as well as such an introduction of the clamping force into the workpiece, a surface F1, i.e. the size of the contact surface 116, is dimensioned such that the size of the surface F2, i.e. the surface on which the workpiece touches the clamping face 107 in the region of the clamping surface 109, is at least ¼ larger than the surface F1.

The first clamping element 104 and the second clamping element 106 are connected to each other by means of a spherical bearing. The spherical bearing comprises the fastening screw 115 and locking pin 114. The fastening screw 115 completely penetrates the second clamping part 106 and the first clamping part 104 and is secured by means of a screw connection in the support spindle 103.

The opening through which the fastening screw 115 extends through the second clamping element part 106 is dimensioned such that the second clamping element part 106 is floatingly supported, in particular is thus a tilting of the second clamping element part 106 relative to the first clamping element part 104 enabled. Similarly, play between the first clamping element part 104 and the locking pins 114 is present. It is thereby ensured that a connection secure from rotary entrainment between the clamping element parts 104 and 106 exists and that on the other hand the tilting of the clamping element parts to one another is made possible.

Figure 5A:
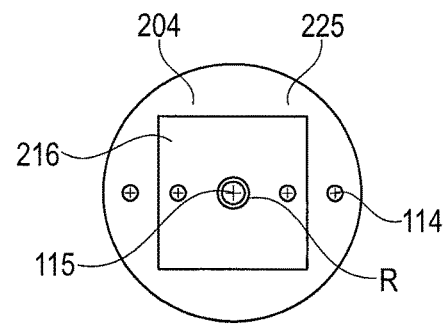
FIG. 5a shows a view according to FIG. 4a of an alternative embodiment of a first clamping element.
Figure 5B:
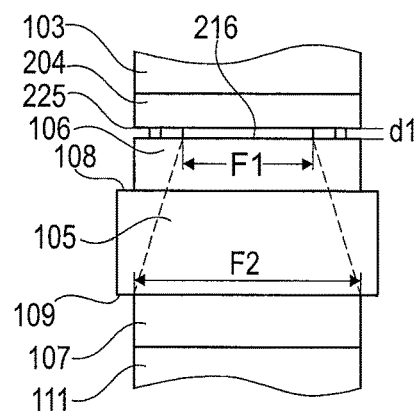
FIG. 5b shows a view according to FIG. 4b of a workpiece holding region of the workpiece holding device of FIG. 3 during use of the first clamping element shown in FIG. 5.

In FIGS. 5a and 5b, an alternative embodiment of a first clamping element part 204 is shown. The elements of the first clamping element part 204 corresponding functionally to those of the first clamping element part 104 bear the same reference characters, but increased by 100.

As can be seen by comparing FIGS. 4a and 5a, the first clamping element parts 104 and 204 differ particularly in that the contact surfaces 116 and 216 have different peripheral shapes. Thus, the contact surface 116 has a rectangular peripheral shape, while the contact surface 216 has a square peripheral shape.

It follows that that for the first clamping element part 104, a tilting of the clamping element part 106 in a plane relative to the clamping element part 104, in which the locking pin 114 is also located, is made easier than in a direction perpendicular thereto.

On the other hand, for the first clamping element part 204, the tilting characteristic in the radial directions along the locking pin 114 does not differ in a tilting in a direction perpendicular thereto.

Figure 6A:
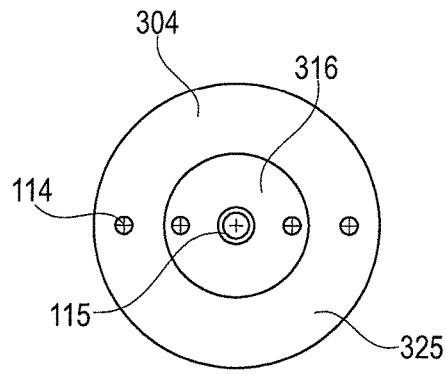
FIG. 6a shows a view according to FIGS. 4a and 5a of a further alternative embodiment of a first clamping element.

In FIG. 6*a*, a third embodiment of a first clamping element part 304 is shown. The elements of the clamping element part 304 corresponding functionally to those of the clamping element part 104 bear the same reference characters, but increased by a factor of 200.

Figure 6B:
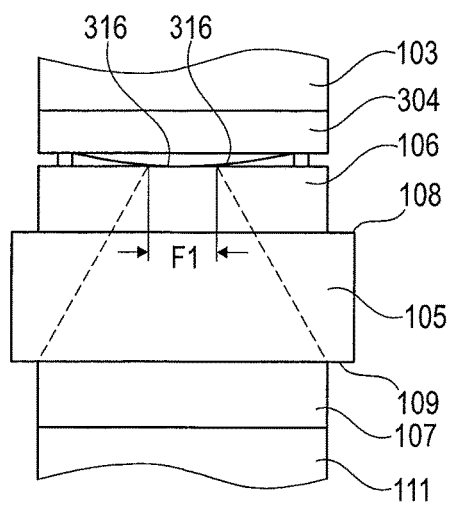

The first clamping element part 304 differs from the clamping element parts 104 and 204, as can be seen particularly in FIG. 6*b*, in that not only the peripheral shape of the first contact surface 316 is rotationally symmetrical. Moreover, the contact surface 316 has a curved surface contour. This has in particular the effect that the contact surface F1 as is shown in FIG. 6*b* is smaller than the contact surface F1 as is shown in FIG. 5*b* for the first clamping element part 204. A tilting of the first clamping element part 304 to the second clamping element part 106 is thereby made additionally easier.

Figure 7A:
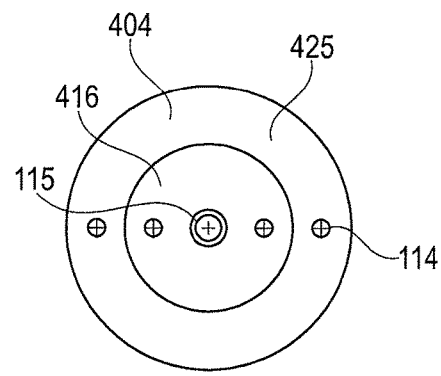
FIG. 7a shows a view according to FIGS. 4a, 5a, 6a of a further alternative embodiment of a first clamping element.

Finally in FIG. 7*a*, a fourth embodiment of a first clamping element part 404 is shown. The elements of the first clamping element part 404 corresponding to those of the first clamping element part 104 bear the same reference characters, but increased by a factor of 300.

Figure 7B:
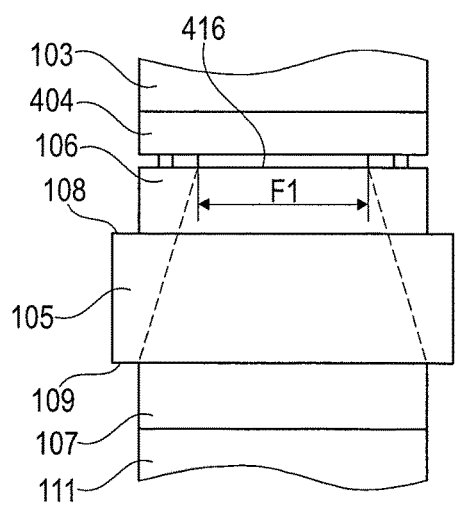

The first clamping portion 404 also has a first contact surface 416 which has a radially symmetrical circumference. However, the contour of the first contact surface 416 is exactly opposite to the contact surface 316. This results in an enlarged supporting surface F1, as shown in FIG. 7, so that tilting between the first clamping element part 404 and the second clamping element part 106 is difficult as compared to the clamping element part 304.

In FIG. 8, a further embodiment of a workpiece holder device according to the invention is shown. The elements of the workpiece holder device in FIG. 8 functionally corresponding to those of the workpiece holder device shown in FIG. 3 bear the same reference characters, but increased by a factor of 400.

As can be seen particularly in FIG. 8, the clamping element 507 and 504, 506 are designed divergently from the clamping elements 107, 104 and 106. In particular, the second clamping element part 506 and the second clamping element 507 have steps 512. This enables that the workpiece 505 is held eccentrically to the first axis R by a force locking and form-fitting attachment.

In FIGS. 9*a* and 9*b*, a further embodiment of a workpiece holder device according to the invention is shown. The elements of the workpiece holder device of FIGS. 9*a* and 9*b* corresponding to those of the workpiece holder device of FIG. 8 bear the same reference characters, but increased by a factor of 100.

In contrast to the workpiece holder device shown in FIG. 3, the workpiece holder device shown in FIGS. 9*a* and 9*b* enables the mounting of a plurality of workpieces 605. For this purpose, the clamping elements 607 and 606 are modified in their design. Corresponding steps 612 are formed in the second clamping element part 606 and the second clamping element part 607.

FIG. 10 shows a further embodiment of a workpiece holder device according to the invention. The elements of the workpiece holder device shown in FIG. 10 functionally corresponding to those of the workpiece holder device shown in FIG. 8 bear the same reference characters, but increased by a factor of 200.

In contrast to the second clamping element part 106, the first clamping element part 706 has steps, which enable that the workpiece 705 can be held force-lockingly as well as form-fittingly in the workpiece holder device. For this purpose, the second clamping element 707 also has corresponding steps 712.

In FIG. 11*a* is shown a further embodiment of a second clamping element part 206 for the workpiece holder device shown in FIG. 3. The second clamping element part 206 has a planar surface. In order to further facilitate a tilting between the first clamping element part and the second clamping element part, it is provided that not only the first clamping element part has an increased contact surface, but additionally or alternatively the second clamping element part 206 has an increased contact surface 217 compared to a surface 227. In the examples shown in FIGS. 11*a* and 11*b* respectively, the contact surface 217 is designed rectangularly.

In FIG. 12*a*, an alternative embodiment of a further second clamping element part 306 with an increased contact surface 317 is shown. The elements of the first clamping element part 306 corresponding to those of the second clamping element part 206 bear the same reference characters, but increased by a factor of 100. The clamping element part 306 has a contact surface 317 having a circular circumference.

In addition, other alternative forms of the peripheral shape of the contact surface 317 may be provided, but also differing contour shapes. A curved contour shape can thus also be used in place of the planar configuration of the contact surfaces 217, 317.

Moreover, the division in two parts of the clamping element is not restricted to the clamping element connected with the support spindle, but can also additionally or alternatively be achieved for the clamping element connected with the drive spindle.

In addition, resetting means can be integrated into the respective clamping element parts. In FIGS. 13*a* and 13*b*, a further embodiment of a second clamping element part 406 is shown. The second clamp section 406 has apertures in which bearing pins 421 are mounted. In an assembly of the workpiece holding device, the bearing pins 421 are located on the surface of the first clamping element part. As can be seen particularly in FIG. 13*b*, free spaces are present on the side of the bearing pins 421 opposite the first clamping element part which are connected to one another via a fluid channel 422. A fluid is introduced into the fluid channel 422 and the free spaces via a fluid port 423, whereby a fluid spring element is formed. Thus can be used, for example, a liquid to provide a hydraulic spring element or a gas to provide a pneumatic spring element.

So that the free spaces may communicate with one another via the channel 422, an indentation of a bearing pin 421 in the clamping element part 406 leads thus that the resetting force on the respective other bearing pins 421 is increased. Other bearing pins 421 on the second clamping element part 406 can thus be deflected, in particular due to a tipping of the first clamping element part and the thereby increasing rise of a localized distance of the clamping element parts. It is thereby achieved that the corresponding tilting movement is assisted.

In FIGS. 14*a* and 14*b* is shown a first clamping element 804 in which bearing pins 406 are embedded in a similar way to the second clamping element part 406. Free spaces behind the bearing pins 821 are also fluidly connected to one another via channels 822.

Figure 15A:
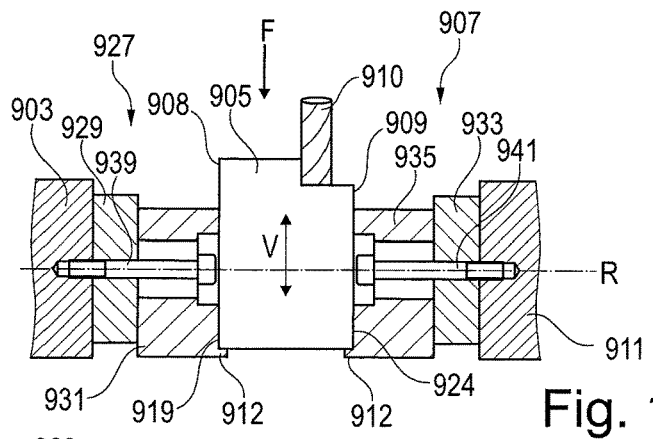
FIG. 15a shows a schematic side view of a workpiece holder device where the clamping elements comprise clamping element members movable relative to one another.

FIG. 15*a* shows a schematic side view of a further embodiment of a workpiece holder device according to the invention. The reference characters of the workpiece holder device shown in FIG. 15a corresponding to those of the workpiece holder device shown in FIG. 3 bear the same reference characters, but increased by a factor of 800.

The workpiece holder device shown in FIG. 15a has a clamping element 927, which comprises a first clamping element member 929 and a second clamping element member 931. The first clamping element member 929 may particularly be an element which, as described in detail in the aforementioned embodiments, comprises at least two clamping element parts. The second clamping element 907 is also formed in two parts; it particularly comprises a clamping element member 933 and a clamping element member 935 movable relative thereto in a direction of displacement V which is perpendicular to the first axis R.

As can further be seen in FIG. 15a, the workpiece 905 is held partially form-fittingly due to the steps 912 formed in the clamping element member 931 and in the clamping element member 935. In order to allow a positioning of the workpiece 905 along the direction of displacement V, in particular to adjust the position of the workpiece 905 relative to the cutter such that the all-around machining of the workpiece 905 is possible, the clamping element members 929, 931 and the clamping element members 933, 935 are movable along a guiding means shown in FIG. 15b. The guiding means 937 is designed in the form of a dovetail guide.

A fixing of the clamping element members 929, 931 and 933, 935 relative to one another is accomplished by means of fastening screws 939, 941. First, the fastening screw 939, 941 are released, so that the clamping element members can be moved relative to one another into the desired position. Then, the fastening screws 939, 941 are again tightened, so that the clamping element members 929, 931 and 933, 935 are fixed relative to one another. In an embodiment not shown may also be provided a displacement means which comprises, for example, a knurled screw.

Figure 15B:
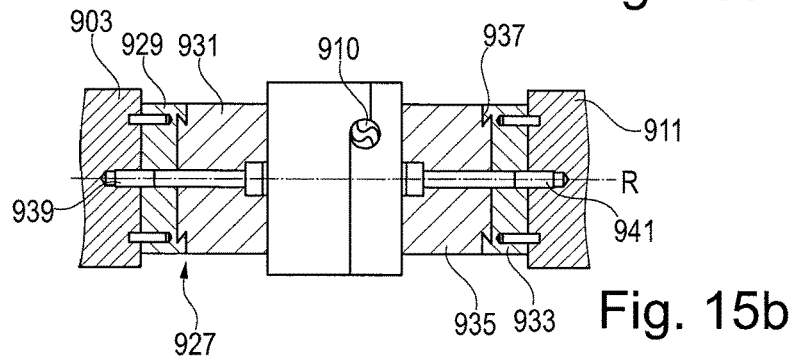
FIG. 15b shows a view of the workpiece holder device of 15a from direction F.

In FIG. 15b is shown a view of the workpiece holder device of FIG. 15a from direction F in FIG. 15a.

To shorten the set-up time for the fitting of the workpiece holder device, the use of a multiple clamping element can be provided.

In FIGS. 16a to 17b, workpiece holder devices are shown in which such multiple clamping elements and clamping bridges are used.

Figure 16A:
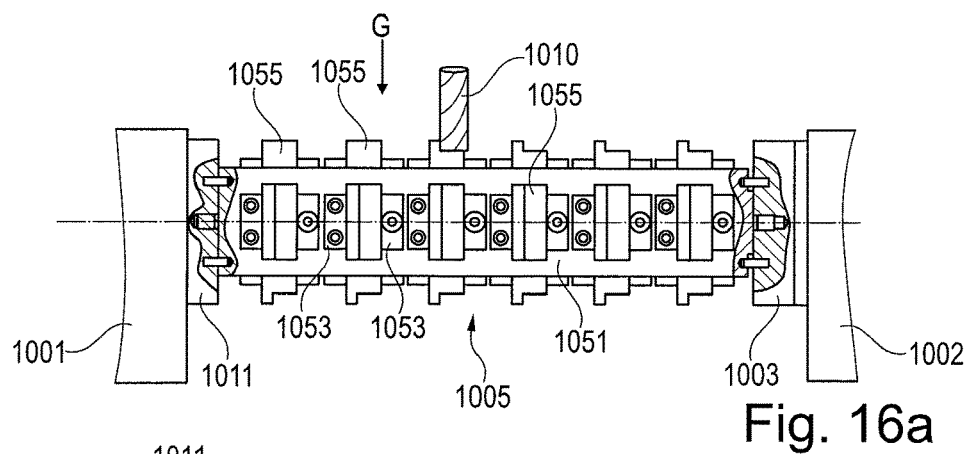
FIG. 16a shows a perspective side view of a workpiece holder device in which a multiple clamping element according to the invention is clamped.
Figure 16B:
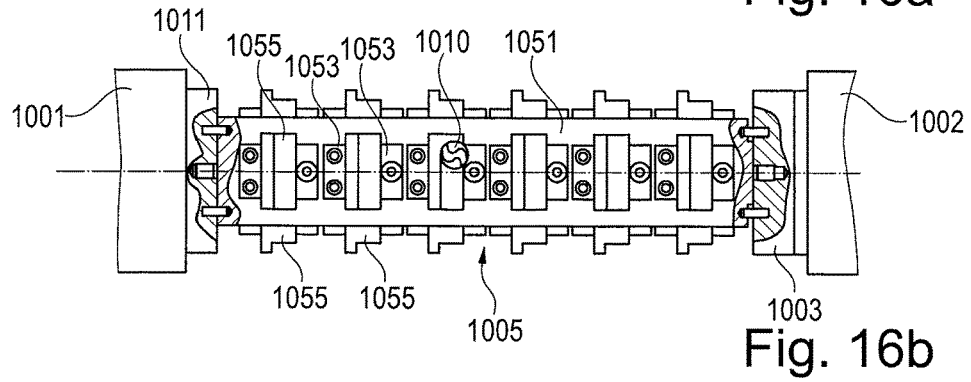
FIG. 16b shows a view of the workpiece holder device with FIG. 16a from direction G.

In FIGS. 16a and 16b, a first embodiment of a workpiece holder device is shown in which such a clamping bridge is used. The elements of the workpiece holder device corresponding to those in the workpiece holder device in FIG. 3 bear the same reference characters, but increased by a factor of 900. The workpiece 1005 is formed by a multiple clamping element 1051. The multiple clamping element 1051 has a plurality of fixing means 1053, on which a plurality of single workpieces 1055 can be fixed on the multiple clamping element 1051.

In FIG. 16b is shown a view of the workpiece holder device of FIG. 16a from direction G.

Through the use of multiple clamping element 1051 is achieved a reduction in setup times of the multiple clamping elements 1051 and thus the single workpieces 1055. A first multiple clamping element may thus be located in the position shown in FIGS. 16a and 16b, hence the single workpieces 1055 are machined by the cutter 1010. At the same time, another multiple clamping element can be fitted with single workpieces and can be changed out with the first multiple clamping element after completion of machining of the workpiece on the first multiple clamping element by means of a robotic controller.

Figure 17A:
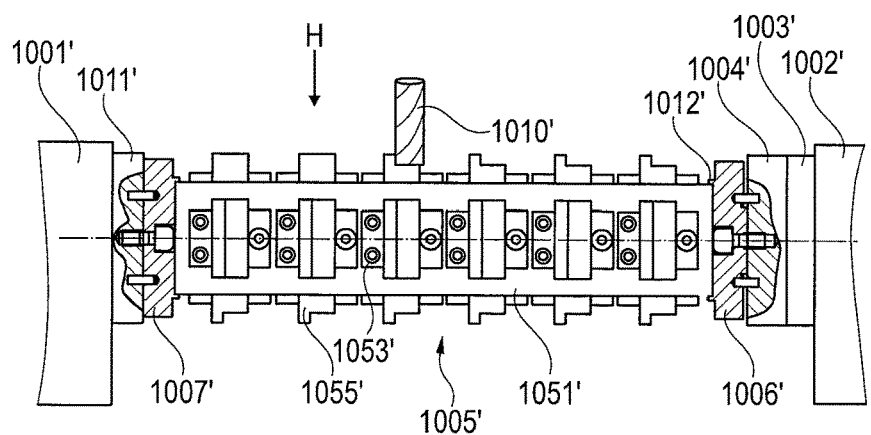
FIG. 17a shows a schematic side view of a workpiece holder device in which a multiple clamping element according to a second embodiment is clamped.
Figure 17B:
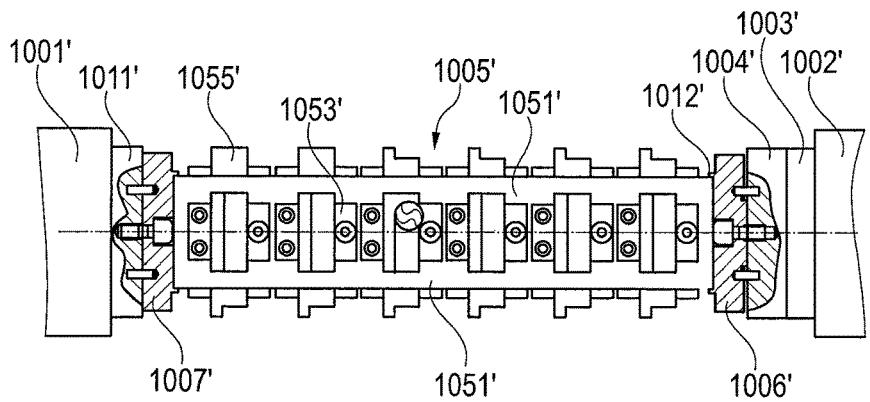
FIG. 17b shows a schematic view of the workpiece holder device of FIG. 17a from direction H.

In FIGS. 17a and 17b is shown a further embodiment of a workpiece holder device, in which, however, the multiple clamping element is not directly fixed on the drive spindle and support spindle, but rather on two-part clamping elements. The elements of the workpiece holder device of FIGS. 17a and 7b corresponding to those of the workpiece holder device of FIGS. 3, 16a and 16b bear the same reference characters, but simply primed and increased by a factor of 900 compared to FIG. 3.

As can be seen in FIGS. 17a and 17b, the multiple clamping element 1051' is not directly disposed on the spindle in the form of a support spindle 1003' and drive spindle 1011', but rather with the interpositioning of a single-part clamping element 1007' and a two-part clamping element, comprising the clamping element parts 1004' and 1006'.

As described above, the two-part design of the clamping element allows an easier compensation of the tilting of an end face of the multiple clamping element 1051'. In order to enable an exact alignment of the multiple clamping element 1051' relative to the cutter 1010, it is particularly preferred that a clamping element part is formed in two parts by means of two clamping element members, displaceable relative to one another as show in FIGS. 15a and 15b. A form locking and form-fitting fixing of the multiple clamping element 1051' in a predetermined position is thus possible by means of steps 1012'.

In FIGS. 18a to 18d is shown finally a support spindle arrangement usable in a workpiece holder device according to the invention.

A clamping force can be built up against the workpiece 1105 by means of the support spindle arrangement 1101. For this purpose, the support spindle arrangement has a support gripping jaw in the form of a clamping element 1107, rotatable relative to a housing 1102 about a first axis R. A movement of the gripping jaw 1107 in an axial direction of the first axis R is possible by means of a hydraulic chamber 1157.

For this purpose, the hydraulic chamber 1157 has a first port 1159 and a second port 1161. The first port 1159 communicates with a first sub-chamber 1163 which is disposed on a first side of a piston 1163, while the port 1161 is fluidly connected to a sub-chamber 1167 which is disposed on the opposite side of the piston 1165.

Figure 18A:
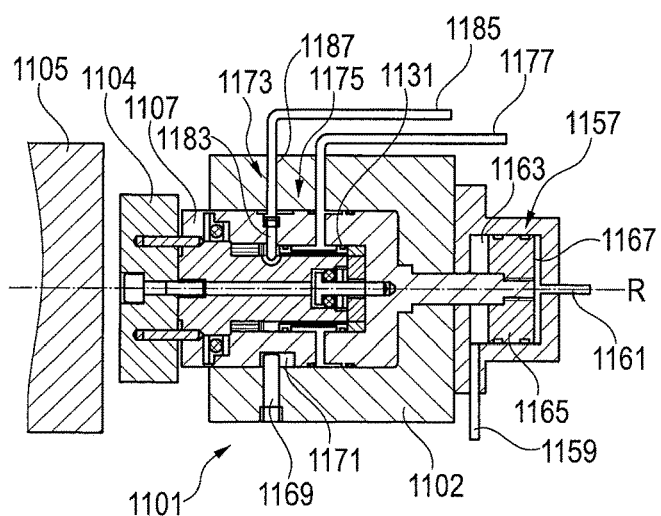
FIG. 18a shows a schematic cross-sectional view of a support spindle usable in a workpiece holder device according to the invention in a first position.
Figure 18B:
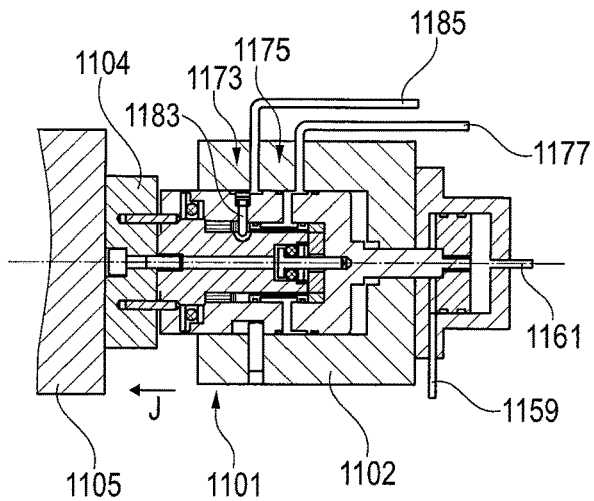
FIG. 18b shows a view of the support spindle of FIG. 18a in a second position.
Figure 18C:
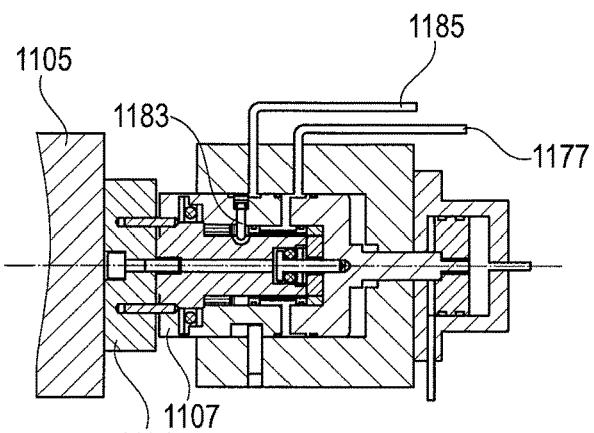
FIG. 18c shows a view of the support spindle of FIGS. 18a and 18b in a third position.

In the position shown in FIG. 18a, a hydraulic fluid is fed into the sub-chamber 1163 through the first line 1159.

This causes that the gripping jaw 1107 is located in a position in which no contact with the workpiece 1105 exists via the clamping element part. The gripping jaw 1107 further presents an additional clamping element part, so that the clamping element as a whole is formed from the two clamping element parts 1104 and 1107. A movement of the gripping jaw 1107 along the first axis R is limited by means of a restricting element 1169, which engages in a recess 1171 of the gripping jaw 1107.

The support spindle arrangement 1101 further has a locking means 1173 and a fixing apparatus 1175. The fixing apparatus 1175 has in particular a hydraulic line 1177. If hydraulic fluid is introduced under pressure via the line 1177, a clamping shoe 1131 is thus pressed against the gripping jaw 1107 such that a movement of the gripping jaw 1107 about the axis R is blocked.

The locking means 1173 comprises a locking element 1183, which is movable by means of the force against a spring element 1187 introduced by hydraulic fluid via a line 1185.

In FIG. 18a, the locking element 1183 is located in a locking position. It is thereby achieved that the gripping jaw 1107 is locked not only in a desired rotational position about the axis R, but also in a predetermined rotational position. If a clamping of the workpiece is desired, a hydraulic fluid is thus introduced via line 1161, while the supply of the hydraulic fluid via line 1159 is interrupted. This causes a movement of the jaw 1107 in a direction J in FIG. 18b, such that the clamping element part 1104 comes into contact with the workpiece 1105. In this position, the gripping jaw 1107 is further set in its rotational position, as both the locking means 1173 and the fixing apparatus 1175 are fixed by the introduction of a hydraulic fluid via the lines 1185 and 1177.

In order to enable a rotation of the clamping jaw 1107 relative to the housing 1102, the locking element 1183 of the locking means 1173 is first converted from the locking position (FIG. 18b) to a release position (FIG. 18c), in which the impingement of the line is 114835 is inhibited by a hydraulic fluid. This causes the locking element 1183 to release from the jaw 1107 in the form of a tappet.

Figure 18D:
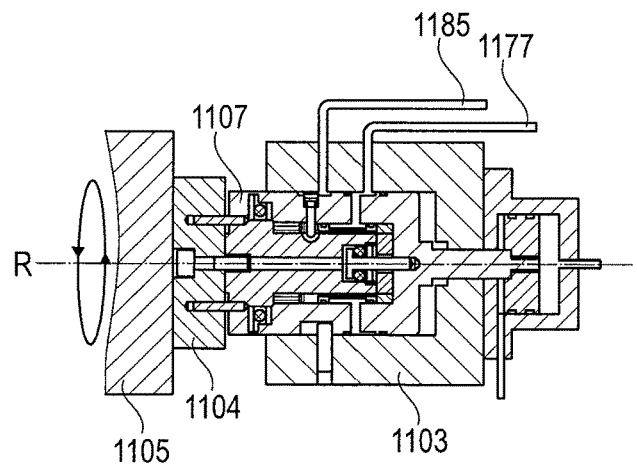
FIG. 18d shows a view of the support spindle of FIGS. 18a to 18c in a fourth position.

If, as is shown in FIG. 18d, the supply of hydraulic fluid via the line 1177 now ends, the fixing of the jaw 1107 via the clamping shoe of the fixing apparatus 1175 is released, and the support spindle and thus the workpiece 1105 can rotate about the axis R. This state is shown in FIG. 18d.

Hereafter, the workpiece can now be machined with simultaneous rotation about the axis R by means of the drive spindle, not shown. The use of the locking means 1173 and the fixing apparatus 1177 offers the advantage that, after machining of the workpiece 1105, the support spindle 1101 can be brought into a predetermined exit position to always ensure a defined initial state of the support spindle in the machining of subsequent workpieces 1105, in particular for the introduction of a further workpiece by means of a robotic controller.

In particular in such cases in which the workpiece 1105 is supported not only by force locking but also partially form-fittingly by means of a support spindle, this predefined starting position is essential. After machining of the workpiece, the locking means 1173 is thus first activated, whereby the movement of the locking element 1183 from the release position into the locking position is caused, such that the supporting jaw 1107 is transferred into the predefined rotational position. As in this state the fixing apparatus 1175 releases the jaw 1107, the jaw 1107 is rotated further about the axis R by the movement of the locking element 1183 until the locking element 1183 is transferred into the locking position. The supporting jaw 1007 can then be fixed in the desired position by means of the fixing apparatus 1175 and the clamping of the workpiece 1105 can be lifted. Thereafter, the cycle begins again in the position shown in FIG. 18a.

The features described in the foregoing description, in the figures and in the claims may be essential to the invention in its various embodiments both singularly and in any combination.

REFERENCE CHARACTERS

1 Housing
2 Housing
3 Support Spindle
4 Clamping Element
5, 5' Workpiece
7 Clamping Element
8, 8' Clamping Surface
9, 9' Clamping Surface
10 Cutter
11 Drive Spindle
20 Machine Frame
R Axis
K1 Clamping Force
K1a Force Component
K1b Force Component
α Angle
101, 501, 601, 701, 1001 Housing
102, 502, 602, 702, 1002, 1102 Housing
103, 503, 603, 703, 903, 1003 Support Spindle
104, 204, 304, 404, 504, 804, 1004', 1104 Clamping Element Part
105, 505, 605, 705, 905, 1005, 1005', 1105 Workpiece
106, 206, 306, 406, 506, 606, 706, 1006' Clamping Element Part
107, 507, 607, 707, 907, 1107' Clamping Element
108, 508, 608, 708, 908 Clamping Surface
109, 509, 609, 709, 909 Clamping Surface
110, 510, 610, 710, 910, 1010, 1001' Cutter
111, 511, 611, 711, 911, 1011, 1011' Drive Spindle
114 Locking Pin
115, 915 Fastening Screw
116, 216, 316, 416 Contact Surface
119, 919 Clamping Face
120, 520, 620, 720 Machine Frame
124, 924 Clamping Face
125, 225, 325, 425 Surface
217, 317 Contact Surface
227, 227 Surface
421, 821 Bearing Pin
422, 822 Fluid Channel
423, 823 Fluid Port
512, 612, 712, 912, 1012' Step
927 Clamping Element
929 Clamping Element Part
931 Clamping Element Part
933 Clamping Element Part
935 Clamping Element Part
937 Guiding Means
939 Fastening Screws
941 Fastening Screws
1051, 1051' Multiple Clamping Element
1053, 1053' Fixing Element
1055, 1055' Single Workpiece
1101 Support Spindle Arrangement
1157 Hydraulic Chamber
1159 Connection
1161 Connection
1163 Sub-Chamber
1165 Piston
1167 Sub-Chamber
1169 Restricting Element
1171 Recess
1173 Locking Means
1175 Fixing Apparatus
1177 Hydraulic Line
1179 Hydraulic Line
1181 Clamping Shoe
1183 Locking Element
1185 Hydraulic Line
1187 Spring Element
α' Angle
d1 Gap
F1, F2 Surface
A, B, C, D, E, F, G, H, I, J Direction
V Direction of Displacement

The invention claimed is:

1. A workpiece holder device for workpieces to be machined on multiple sides, the workpiece holder device comprising:
a first workpiece holder operatively connected to at least one support spindle and rotatable about a first axis (R),
at least one second workpiece holder operatively connected to at least one drive spindle and rotatable around the first axis (R), and
at least one locking means;
wherein, in operation, the workpiece can be held axially and radially relative to the first axis (R) between the first workpiece holder and the second workpiece holder by a clamping force which can be built up in the manner of a vice between the first workpiece holder and the second workpiece holder in the axial direction of the first axis (R) and acting on the opposite sides of the workpiece,
wherein the first workpiece holder comprises at least one first clamping element with a first smooth clamping face facing towards the second workpiece holder and the workpiece and the second workpiece holder comprises at least a second clamping element with a second smooth clamping face facing towards the first workpiece holder and the workpiece,
wherein the at least one locking means is configured to enable at least one of the first workpiece holder and the first clamping element to be lockable in at least one predetermined rotational position about the first axis, and
wherein the at least one locking means comprises a locking element moveable from a release position into a locking position to enable at least one of the first workpiece holder and the second workpiece holder to be movable from a rotational position different from the predetermined rotational position into the predetermined rotational position.

2. The workpiece holder device according to claim 1, wherein the first clamping element and/or the second clamping element is or are constructed in multiple parts, whereby a first clamping element part of the respective clamping element is movable relative to a second clamping element part of the relevant clamping element in such a way that a first angle (α') between the first axis (R) and the normal direction of the first clamping face and a second angle between the first axis and the normal direction of the second clamping face is variable.

3. The workpiece holder device according to claim 1,
wherein the first clamping element and the second clamping element are constructed in two pieces,
wherein the support spindle is mounted in at least one first housing reciprocably displaceable in the coaxial direction of the first axis (R) by at least one drive means,
wherein the drive spindle is mounted in at least one second housing (101) and/or
wherein the drive spindle comprises at least one angle-switchable angle switching means about the first axis (R), and
wherein in particular the first housing and the second housing are mounted on at least a support structure, such as a machine frame.

4. The workpiece holder device according to claim 1,
wherein at least one of the angle switching means and the drive means comprise at least one motor, electric motor, hydraulic actuator or pneumatic actuator,
wherein the clamping force built up by first workpiece holder and the second holder substantially acts exclusively by force locking,
wherein the first clamping face and the second clamping face are disposed on the surface of the second clamping element part away from the first clamping element part and in the region of the first clamping face and in the region of the second clamping face is provided a fictional resistance-increasing corrugation, or
wherein the first clamping element part and the second clamping element part are connected to one another via at least one spherical bearing.

5. The workpiece holder device according to claim 1,
wherein the first clamping element part is in contact in the region of at least one first contact surface with at least one second contact surface of the second clamping element part,
wherein the first axis (R) runs through a center of gravity of a projection of the first contact surface in a plane perpendicular to the first axis (R), or a center of gravity of a projection of the second contact surface in a plane perpendicular to the first axis (R),
wherein the first contact surface is smaller than a first surface of the first clamping element part facing the second clamping element part and the second contact surface is smaller than a second surface of the second clamping element part facing the first clamping element part,
wherein the surface area of the first surface is more than 125% of the surface area of the first contact surface and the surface area of the second surface is more than 125% of the surface area of the second contact surface (217), and the first contact surface at least partially protrudes from the first surface and the second contact surface at least partially protrudes from the second surface and the second contact surface at least partially protrudes from the second surface,
wherein the first contact surface and the second contact surface extend at least partially perpendicular to the first axis (R), at least partially having a curved contour and/or extending in an incline in a plane spanned by the first axis and perpendicular to the first axis (R), or
wherein the first contact surface and the second contact surface have a square, circular, elliptical or rectangular peripheral shape in a plane perpendicular to the first axis (R).

6. The workpiece holder device according to claim 4,
wherein the spherical bearing comprises at least one fixing element at least partially penetrating the first clamping element part and the second element part, the fixing element at least partially penetrates into the drive spindle or the support spindle, is connected with the drive spindle or the support spindle, the second clamping element part is movable relative to the fixing element.

7. The workpiece holder device according to claim 1,
wherein at least one resetting means at least partially disposed between the first clamping element part and the second clamping element part comprises at least one mechanical, hydraulic or pneumatic spring means, the spring means comprises at least one bearing pin at least partially mounted in the first clamping element part and abutting the second clamping element part (106), the second contact surface and the second surface, and at least one bearing pin at least partially mounted in the second clamping element part and abutting the first clamping element part, whereby a resetting force can be exerted onto the second clamping element part via the bearing pin by means of at least one resetting element on a bearing pin mounted in the first clamping element part on the side opposite the second clamping element part, and onto the first clamping element part via the bearing pin by means of at least one resetting element on a bearing pin mounted in the second clamping element part on the side opposite the first clamping element part, the resetting element comprises at least one mechanical spring element, at least one compressible or incompressible fluid comprising fluid spring element which is constituted by free space filled by fluid, is disposed at least partially through at least one bearing pin mounted in the first clamping element part on the side opposite the second clamping element part, or at least partially through at least one bearing pin mounted in the first clamping element part on the side opposite the first clamping element part, whereby a plurality of bearing pins and fluid spring elements are provided and at least two free spaces are connected with each other by means of at least one fluid channel at least partially formed in the first clamping element part and the second clamping element part, wherein the pressure of the fluid in the free spaces or in the channel is adjustable by means of at least one fluid port.

8. The workpiece holder device according to claim 1, wherein the first clamping element, the second clamping element, the first clamping element part and the second clamping element part comprises on a side facing the workpiece at least one elevation, whereby the workpiece is at least partially form-fittingly holdable by means of the elevation, the workpiece in particular at least partially abuts the elevation.

9. The workpiece holder according to claim 1, wherein the first clamping element, the second clamping element, the first clamping element part and the second clamping element part are constructed in two parts, whereby at least a first clamping element member of the respective clamping element or clamping element parts are movable relative to at least one second clamping element member of the concerned clamping element or clamping element part in a direction of displacement, wherein the workpiece holder device comprises at least one guiding means, by which the first clamping element member and the second clamping element member are led along a direction of displacement relative to one another, comprising at least one transmission thread, at least one gearing, at least one tongue and groove connection or at least one dovetail guide, or wherein the movement along the direction of displacement is adjustable, controllable or regulated by means of at least one displacement means; the displacement means comprises at least one knurled screw, at least one transmission thread or at least one electric, pneumatic, hydraulic or mechanical displacement actuator.

10. The workpiece holder device according to claim 1, wherein the workpiece comprises at least one multiple clamping element, wherein at least one single workpiece, can be connected with the multiple clamping elements by means of at least one fixing means, wherein the single workpiece is connectible with the multiple clamping element form-fittingly or through force locking by means of a fixing element or a plurality of fixing elements along the first axis or along the surface of the multiple clamping element is provided around a circumference of the first axis or the multiple clamping elements abuts the first workpiece holder, the second workpiece holder, the first clamping element, the second clamping element, the first clamping element part, the second clamping element part, the first clamping element member or the second clamping element member.

11. The workpiece holder device according to claim 1, wherein the first clamping element part, the second clamping element part, the first clamping element member or the second clamping element member of the first clamping element is or are lockable by the locking means,
wherein the locking means comprises at least one locking element, wherein the locking element by means of at least one hydraulic, pneumatic, magnetic, electromagnetic or mechanical locking actuator, against the force of the at least one spring element, can be brought into engagement with the first workpiece holder of the first clamping element, in particular the first clamping element part, the second clamping element part, the first clamping element member or the second clamping element member of the first clamping element, or
wherein the first clamping element part, the second clamping element part, the first clamping element member or the second clamping element member of the first clamping element is or are movable from a rotational position different from the predetermined rotational position into the predetermined rotational position by the locking means.

12. The workpiece holder device according to claim 1, wherein at least one fixing apparatus, by means of which the first workpiece holder, the second workpiece holder, the first clamping element, the second clamping element, the first clamping element part, the second clamping element part, the first clamping element member or the second clamping element member can be locked in any desired rotational position about the first axis, whereby the fixing apparatus comprises at least one hydraulic, pneumatic, magnetic, electromagnetic or mechanical locking actuator.

13. A workpiece holder device for workpieces (105) to be machined on multiple sides, the workpiece holder device comprising:
a first workpiece holder operatively connected to at least one support spindle and rotatable about a first axis (R), and
at least one second workpiece holder operatively connected to at least one drive spindle and rotatable around the first axis (R),
wherein, in operation, the workpiece can be held axially and radially relative to the first axis (R) between the first workpiece holder and the second workpiece holder by a clamping force which can be built up in the manner of a vice between the first workpiece holder and the second workpiece holder in the axial direction of the first axis (R) and acting on the opposite sides of the workpiece,
wherein the first workpiece holder comprises at least one first clamping element with a first smooth clamping face facing towards the second workpiece holder and the workpiece and the second workpiece holder comprises at least a second clamping element with a second smooth clamping face facing towards the first workpiece holder and the workpiece,
wherein the first clamping element and the second clamping element are constructed of a plurality of parts, wherein a first clamping element part of a particular clamping element can be moved relative to the second clamping element part of the clamping element in such a manner that a first angle (α') between the first axis (R) and the normal direction of the first clamping face and a second angle between the first axis and the normal direction of the second clamping face can be varied;

wherein the first clamping element part is in contact with at least one second contact surface of the second clamping element part in the region of at least one first contact surface, and wherein the first axis (R) is defined by a center of gravity of the first contact surface or a center of gravity of the second contact surface, and wherein the first contact surface is smaller than the second clamping element part facing first surface of the first clamping element part or the second contact surface is smaller than the second surface of the second clamping element part facing the first clamping element part.

14. The workpiece holder device according to claim 13, wherein the first clamping element and the second clamping element are constructed in two pieces, the support spindle is mounted in at least one first housing and the support spindle and the first housing is mounted displaceably in the coaxial direction of the first axis (R) by at least one drive means, the drive spindle is mounted in at least one second housing and the drive spindle comprises at least one angle-switchable angle switching means about the first axis (R);

wherein the first housing and the second housing are mounted on at least one support structure, such as a machine frame.

15. The workpiece holder device according to claim 13, wherein
the angle switching means and the drive means comprises at least one motor, electric motor driven, hydraulic actuator or pneumatic actuator;
the clamping force built up by first workpiece holder and the second holder substantially acts by force locking;
the first clamping face and the second clamping face are disposed on the surface of the second clamping element part away from the first clamping element part and in the region of the first clamping face and in the region of the second clamping face is provided a fictional resistance-increasing corrugation or a covering; or
the first clamping element part and the second clamping element part are connected to one another via at least one spherical bearing.

16. The workpiece holder device according to claim 13, wherein the first contact surface and the second contact surface extend at least partially perpendicular to the first axis (R), at least partially having a curved contour and/or extending in an incline in a plane spanned by the first axis and perpendicular to the first axis (R); or
wherein the first contact surface and the second contact surface have a square, circular, elliptical or rectangular peripheral shape in a plane perpendicular to the first axis (R).

17. The workpiece holder device according to claim 15, wherein the spherical bearing comprises at least one fixing element at least partially penetrating the first clamping element part and the second element part.

18. The workpiece according to claim 17,
wherein a plurality of fixing elements is provided, the fixing element at least partially penetrates into the drive spindle or the support spindle, is connected with the drive spindle or the support spindle by means of at least one connecting means, and the second clamping element part is movable relative to the fixing element;

wherein the connecting means comprises at least one screw connection, at least one snap-in connection, at least one clip connection or at least one adhesive connection.

19. The workpiece holder device according to claim 13, wherein at least one resetting means at least partially disposed between the first clamping element part and the second clamping element part comprises at least one mechanical, hydraulic or pneumatic spring means, the spring means comprises at least one bearing pin at least partially mounted in the first clamping element part and, abutting the second contact surface and the second surface, and at least one bearing pin at least partially mounted in the second clamping element part and abutting the first contact surface and the first surface, whereby a resetting force can be exerted onto the second clamping element part via the bearing pin by means of at least one resetting element on a bearing pin mounted in the first clamping element part on the side opposite the second clamping element part and onto the first clamping element part via the bearing pin by means of at least one resetting element on a bearing pin mounted in the second clamping element part on the side opposite the first clamping element part.

20. The workpiece holder device according to claim 19,
wherein the resetting element comprises at least one mechanical spring element, at least one compressible or incompressible fluid comprising fluid spring element, a hydraulic spring element or pneumatic spring element;
wherein the fluid spring element, which is constituted by free space filled by fluid, is disposed at least partially through at least one bearing pin mounted in the first clamping element part on the side opposite the second clamping element part, or at least partially through at least one bearing pin mounted in the first clamping element part on the side opposite the first clamping element part, whereby a plurality of bearing pins and fluid spring elements are provided and at least two free spaces, are connected with each other by means of at least one fluid channel, in particular at least partially formed in the first clamping element part and the second clamping element part;
wherein the pressure of the fluid in the free spaces and in the channel is adjustable by means of at least one fluid port.

21. The workpiece holder device according to claim 13, wherein the first clamping element, the second clamping element, the first clamping element part and the second clamping element part comprises on a side facing the workpiece at least one step, whereby the workpiece is preferably at least partially form-fittingly holdable by means of the step, the workpiece at least partially abuts the step.

22. The workpiece holder device according to claim 13,
wherein the first clamping element, the second clamping element, the first clamping element part and the second clamping element part are constructed in in two parts, whereby at least a first clamping element member of the respective clamping element and clamping element parts are movable relative to at least one second clamping element member in a radial direction of the first axis.

23. The workpiece holder device according to claim 22
wherein the first clamping element member and the second clamping element member are led along a direction of displacement relative to one another by at least one guiding means comprising at least one transmission thread, at least one gearing, at least one tongue and groove connection or at least one dovetail guide.

24. The workpiece holder device according to claim 22, wherein the movement along the direction of displacement is adjustable, controllable or regulated by means of at least one displacement means; the displacement means comprises at least one knurled screw, at least one transmission thread or at least one electric, pneumatic, hydraulic or mechanical displacement actuator.

25. The workpiece holder device according to claim 13, wherein the workpiece comprises at least one multiple clamping element, wherein a plurality of single workpieces, can be connected with the multiple clamping element by means of at least one fixing means.

26. The workpiece holder device according to claim 25, wherein
    (i) the single workpiece is connectible with the multiple clamping element form-fittingly or through force locking by means of a fixing element and a plurality of fixing elements along the first axis and along the surface of the multiple clamping element is provided around a circumference of the first axis; and
    (ii) the multiple clamping element abuts the first workpiece holder, the second workpiece holder, the first clamping element, the second clamping element, the first clamping element part, the second clamping element part, the first clamping element member or the second clamping element member.

27. The workpiece holder device according to claim 13, wherein at least one locking means for locking the first workpiece holder, the second workpiece holder, the first clamping piece, the second clamping portion, the first clamping piece part, the second clamping piece part, the first clamping piece element or the second clamp element in at least a first predetermined rotational position about the first axis is locked; wherein
    (a) the locking means comprises at least one locking element, wherein the locking element comprises at least one hydraulic, pneumatic, magnetic, electromagnetic and/or mechanical locking actuator, which against the force of the at least one spring element, can be brought into engagement with the first workpiece holder, the second workpiece holder, the first clamping element, the second clamping element, the first clamping element part, the second clamping element part, the first clamping element member or the second clamping element member;
    (b) by means of a locking means, through a movement of the locking element from a release position into a locking position, the first workpiece holder, the second workpiece holder, the first clamping element, the second clamping element, the first clamping element part, the second clamping element part, the first clamping element member or the second clamping element member are movable from a rotational position different from the predetermined rotational positions into a predetermined rotational position; or
    (c) at least one fixing apparatus, with which the first workpiece holder, the second workpiece holder, the first clamping element, the second clamping element, the first clamping element part, the second clamping element part, the first clamping element member or the second clamping element member can be locked in any desired rotational position about the first axis;
    wherein the fixing apparatus comprises at least one hydraulic, pneumatic, magnetic, electromagnetic or mechanical locking actuator.

\* \* \* \* \*